United States Patent
Suzuki et al.

(10) Patent No.: US 7,916,904 B2
(45) Date of Patent: Mar. 29, 2011

(54) FACE REGION DETECTING DEVICE, METHOD, AND COMPUTER READABLE RECORDING MEDIUM

(75) Inventors: Tomoharu Suzuki, Anjo (JP); Jun Adachi, Obu (JP); Shinichi Kojima, Nisshin (JP); Kenichi Ohue, Toyota (JP); Yuji Ninagawa, Aichi-ken (JP); Shigeyasu Uozumi, Toyota (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 585 days.

(21) Appl. No.: 12/050,620

(22) Filed: Mar. 18, 2008

(65) Prior Publication Data
US 2008/0232650 A1 Sep. 25, 2008

(30) Foreign Application Priority Data

Mar. 19, 2007 (JP) ................................. 2007-071524

(51) Int. Cl.
G06K 9/00 (2006.01)
G06K 9/48 (2006.01)
G06K 9/46 (2006.01)
A61B 3/14 (2006.01)

(52) U.S. Cl. ........ 382/118; 382/117; 382/199; 382/203; 351/206

(58) Field of Classification Search ................... 382/118, 382/117, 116, 190, 203, 209, 254, 199, 266; 351/206; 348/78; 435/100; 705/26
See application file for complete search history.

(56) References Cited

U.S. PATENT DOCUMENTS

| | | | | |
|---|---|---|---|---|
| 5,495,338 A * | 2/1996 | Gouriou et al. | ............... | 356/402 |
| 6,091,836 A * | 7/2000 | Takano et al. | ............... | 382/118 |
| 6,937,755 B2 * | 8/2005 | Orpaz et al. | ............... | 382/162 |
| 7,079,158 B2 * | 7/2006 | Lambertsen | ............... | 345/630 |
| 7,123,753 B2 * | 10/2006 | Takahashi et al. | ........... | 382/117 |
| 7,146,983 B1 * | 12/2006 | Hohla et al. | ............... | 128/898 |
| 7,436,987 B2 * | 10/2008 | Takano et al. | ............... | 382/117 |
| 2003/0053663 A1 * | 3/2003 | Chen et al. | ................ | 382/117 |
| 2006/0045317 A1 | 3/2006 | Adachi et al. | | |
| 2008/0081996 A1 * | 4/2008 | Grenon et al. | ............... | 600/443 |

FOREIGN PATENT DOCUMENTS

JP 03-202045 9/1991
(Continued)

OTHER PUBLICATIONS

Japanese Office Action dated Jan. 20, 2009, with translation (10 pages).
(Continued)

*Primary Examiner* — Sheela C Chawan
(74) *Attorney, Agent, or Firm* — Sughrue Mion, PLLC

(57) ABSTRACT

An image capturing section captures a face of an observed person. A position detecting section detects, from a face image expressing the face captured by the image capturing section, one of a position expressing a characteristic of a nose and a position expressing a characteristic of a region between eyebrows. A computing section computes a past relative position of a predetermined region of the face that is based on the position detected in the past by the position detecting section. A region position detecting section detects a position of the predetermined region on the basis of the past relative position computed by the computing section and the current position detected by the position detecting section.

5 Claims, 13 Drawing Sheets

FOREIGN PATENT DOCUMENTS

| | | | |
|---|---|---|---|
| JP | 07-181012 A | 7/1995 |
| JP | 07-313459 A | 12/1995 |
| JP | 8-101915 A | 4/1996 |
| JP | 10-044824 A | 2/1998 |
| JP | 10-63850 A | 3/1998 |
| JP | 11-66320 A | 3/1999 |
| JP | 2000-067225 A | 3/2000 |
| JP | 2000-123188 A | 4/2000 |
| JP | 2000-137792 A | 5/2000 |
| JP | 2000-339457 A | 12/2000 |
| JP | 3143819 B2 | 1/2001 |
| JP | 2001-307076 A | 11/2001 |
| JP | 3312562 B2 | 5/2002 |
| JP | 3444115 B2 | 6/2003 |
| JP | 2005-25568 A | 1/2005 |
| JP | 2005-296349 A | 10/2005 |
| JP | 2006-065673 A | 3/2006 |

OTHER PUBLICATIONS

Japanese Office Action issued in JP 2007-063149 dated Feb. 3, 2009 (14 pages).

Song, Xinguang, "Extraction of Facial Organ Features Using Partial Feature Template and Global Constraints," The IEICE Transactions of Institute of Information and Communication Engineers, Aug. 25, 1994, J77-D-II No. 8, pp. 1601-1609.

International Search Report issued in PCT/JP2007/073311 dated Dec. 25, 2007 (3 pages).

* cited by examiner

FACE REGION DETECTING DEVICE, METHOD, AND COMPUTER READABLE RECORDING MEDIUM

CROSS-REFERENCE TO RELATED APPLICATION

This application is based on and claims priority under 35 USC 119 from Japanese Patent Application No. 2007-71524 filed Mar. 19, 2007.

BACKGROUND

1. Technical Field

The present invention relates to a face region detecting device, method, and computer readable recording medium, and in particular, relates to a face region detecting device, method, and computer readable recording medium which detect the position of a predetermined region of a face from an image in which the face is captured.

2. Related Art

There have conventionally been known dozing state detecting devices which, on the basis of eye positions which were measured a previous time, set eye search regions, and if eyes are found within the eye search regions, consider them to be the same as those which were found the previous time (Japanese Patents Nos. 3312562, 3444115).

There is also known an eye position detecting device which detects the position of the nose, and sets eye search regions by using the detected nose position as the reference (Japanese Patent Application Laid-Open (JP-A) No. 2000-67225).

Further, there is known an eye state detecting device which investigates the vertical direction distance between the nose or an eyebrow or the like and an upper eyelid, and judges whether or not an eye is being detected accurately (JP-A No. 2001-307076).

However, in a case in which the eye search regions are set on the basis of the eye positions which were measured the previous time as described above, if the face moves greatly to the left or right, the eyes will come out of the set eye search regions, and there is therefore the problem that the eyes cannot be detected.

Further, in a case in which the eye search regions are set by using the detected nose position as the reference as described above, there is the problem that, if plural eye candidates are found within the eye search region, complex processing is needed in order to detect the position of the eye.

Moreover, in a case in which the vertical direction distance between the nose or the eyebrow or the like and the upper eyelid is investigated as described above, because the positional relationship between the position of the nose or the eyebrow and the upper eyelid is investigated only in the vertical direction, there is the problem that the eye cannot be detected correctly if the face moves toward the left or right.

SUMMARY

The present invention has been made in view of the above circumstances and provides a face region detecting device.

The present invention provides a face region detecting device having: an image capturing section capturing a face of an observed person; a position detecting section detecting, from a face image expressing the face captured by the image capturing section, one of a position expressing a characteristic of a nose and a position expressing a characteristic of a region between eyebrows; a computing section computing a past relative position of a predetermined region of the face that is based on the position detected in the past by the position detecting section; and a region position detecting section detecting a position of the predetermined region on the basis of the past relative position computed by the computing section and the current position detected by the position detecting section.

A face region detecting method relating to the present invention includes: detecting, from a face image expressing a face captured by an image capturing section that captures a face of an observed person, one of a position expressing a characteristic of a nose and a position expressing a characteristic of a region between eyebrows; computing a past relative position of a predetermined region of the face that is based on the position detected in the past; and detecting a position of the predetermined region on the basis of the computed past relative position and the detected current position.

The present invention provides a computer readable medium storing a program causing a computer to execute a process for face region detection, the process including: detecting, from a face image expressing a face captured by an image capturing section that captures a face of an observed person, one of a position expressing a characteristic of a nose and a position expressing a characteristic of a region between eyebrows; computing a past relative position of a predetermined region of the face that is based on the position detected in the past; and detecting a position of the predetermined region on the basis of the computed past relative position and the detected current position.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described hereinafter in detail with reference to the drawings. Note that, in the present exemplary embodiments, examples are described of cases in which the present invention is applied to eye position detecting devices which detect and track the positions of eyes from a face image which is captured continuously.

Figure 1:
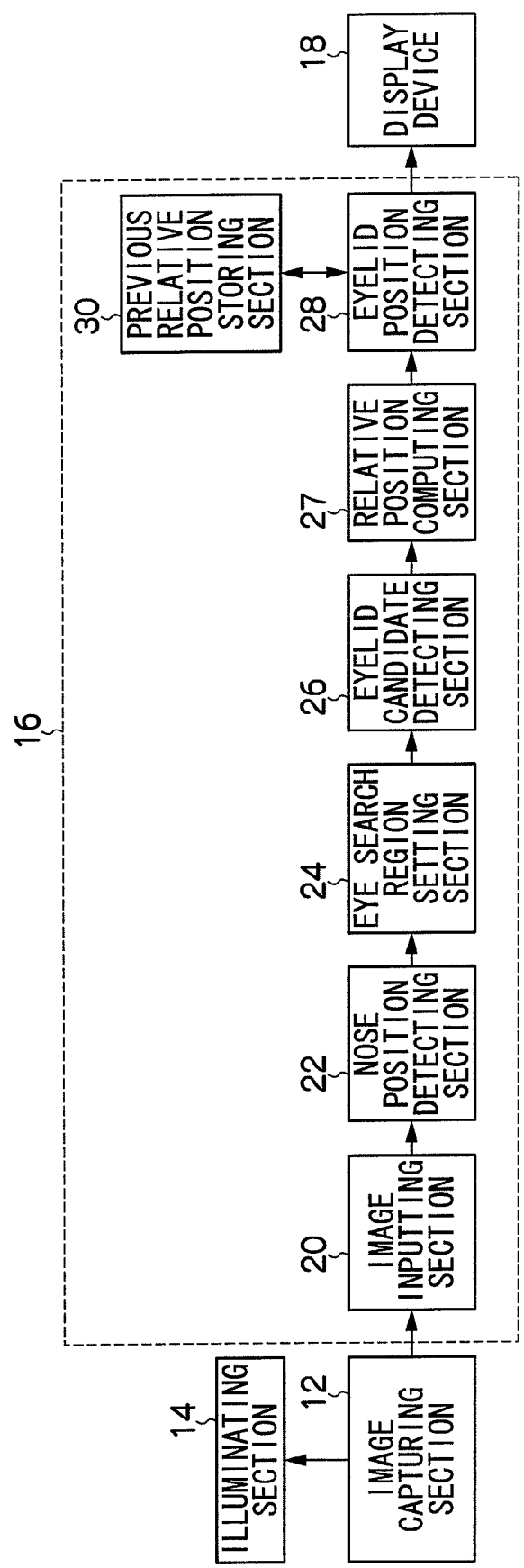
FIG. 1 is a drawing showing the structure of an eye position detecting device relating to a first exemplary embodiment of the present invention.

As shown in FIG. 1, an eye position detecting device 10 relating to a first exemplary embodiment has an image capturing section 12 formed from a CCD camera or the like and capturing an image including the face of a subject that is the object, an illuminating section 14 formed from an infrared flash, an infrared LED or the like for illuminating the object of photographing synchronously with the operation of a shutter of the image capturing section 12, a computer 16 carrying out image processing, and a display device 18 structured by a CRT or the like.

The computer 16 is structured to include a CPU, a ROM that stores the program of an image processing routine to be described later, a RAM that stores data and the like, and a bus connecting these. To describe the computer 16 in terms of functional blocks which are divided into respective function realizing sections which are determined on the basis of hardware and software, as shown in FIG. 1, the computer 16 has: a image inputting section 20 inputting a face image which is a gray-level image outputted from the image capturing section 12; a nose position detecting section 22 detecting the position of a nose from the face image which is the output of the image inputting section 20; an eye search region setting section 24 setting eye search regions on the basis of the nose position; an eyelid candidate detecting section 26 detecting plural candidates for the positions of the lower eyelids from the images of the eye search regions; a relative position computing section 27 computing the relative positions of the respective candidates for the lower eyelid positions, with respect to the nose position; an eyelid position detecting section 28 detecting, on the basis of the relative positions of the respective candidates for the lower eyelid positions, the positions of the lower eyelids as the eye positions; and a previous relative position storage section 30 storing the relative positions of the eyelid positions with respect to the nose position of the previous time.

The image inputting section 20 is structured by, for example, an A/D converter, an image memory that stores the image data of one image surface, and the like.

As will be described later, the nose position detecting section 22 detects the positions of the left and right nostrils (positions expressed by image coordinates) as positions expressing characteristics of the nose from the face image, and detects the image coordinates of the central point of the positions of the left and right nostrils as the nose position.

Figure 2:
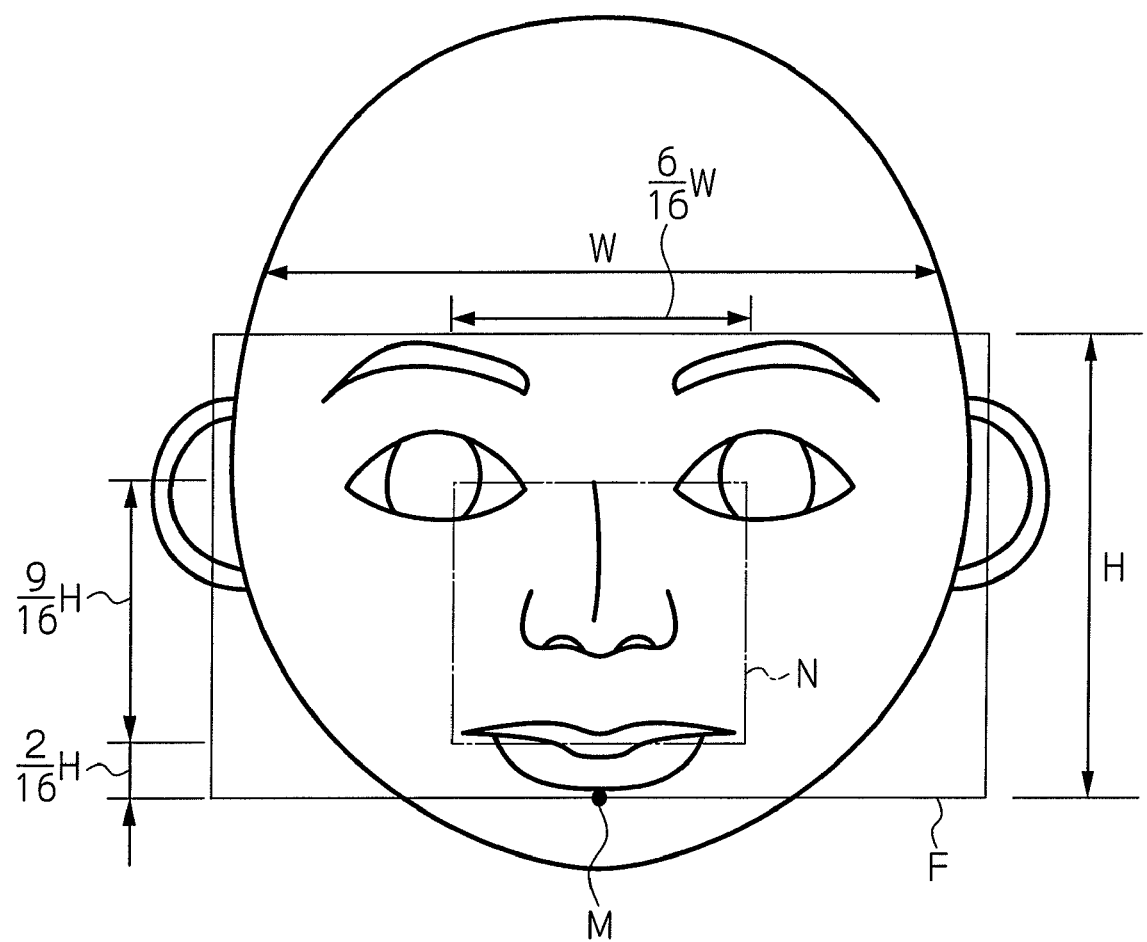
FIG. 2 is a drawing showing a face region and a nostril search region that are set in a face image.

First, as shown in FIG. 2, a face region F is extracted from the face image. In the extraction of the face region F, the edge of the face contour is computed, or the face contour is extracted by pattern matching of the face contour, and then the face region F is extracted in the range of the face contour. Then, from the bottom of the face region F, the edge of the mouth bottom is detected, and a mouth bottom position M is detected. On the basis of the mouth bottom position M, a nostril search region for searching for the nostrils is set. At this time, a nostril search region N is set within the face region F by using a ratio which is based on the position of the mouth bottom and statistical data. In particular, the nostril search region N is set at a position which is separated upwardly by a predetermined distance from the detected mouth bottom position M, so as to set the nostril search region in the central portion of the face.

For example, given that the length of the face region F is H and the width thereof is W, a rectangular region of a length of $9/16 \cdot H$ and a width of $6/16 \cdot W$ is set as the nostril search region N at a position separated by $2/16 \cdot H$ upwardly from the mouth bottom position M and a position that is the center of the face region F in the lateral direction.

Then, two adjacent, substantially circular, dark places are searched for within the range of the nostril search region N, and regions expressing the nostrils are detected. For example, horizontal direction edges and vertical direction edges are detected in the range of the nostril search region N. Here, a point that changes from light to dark from the left side toward the right side is a vertical positive edge, and a point that changes from dark to light from the left side toward the right side is a vertical negative edge. Further, a point that changes from light to dark from the upper side toward the lower side is a lateral positive edge, and a point that changes from dark to light from the upper side toward the lower side is a lateral negative edge. The region expressing one nostril is detected from a region at which a vertical positive edge appears at the left, a vertical negative edge appears at the right, a lateral positive edge appears at the top, and a lateral negative edge appears at the bottom.

A region obtained by the above-described positional relationship of these four types of edges is a candidate for a region expressing one nostril. In a case in which two of these groups of edges are detected to be lined-up laterally and adjacent to one another, these are nostril candidates. Further, if two or more nostril candidates are detected in the nostril search region N, the nostril candidates that are nearest to the mouth bottom position M thereamong are judged to be the nostrils.

Figure 3:
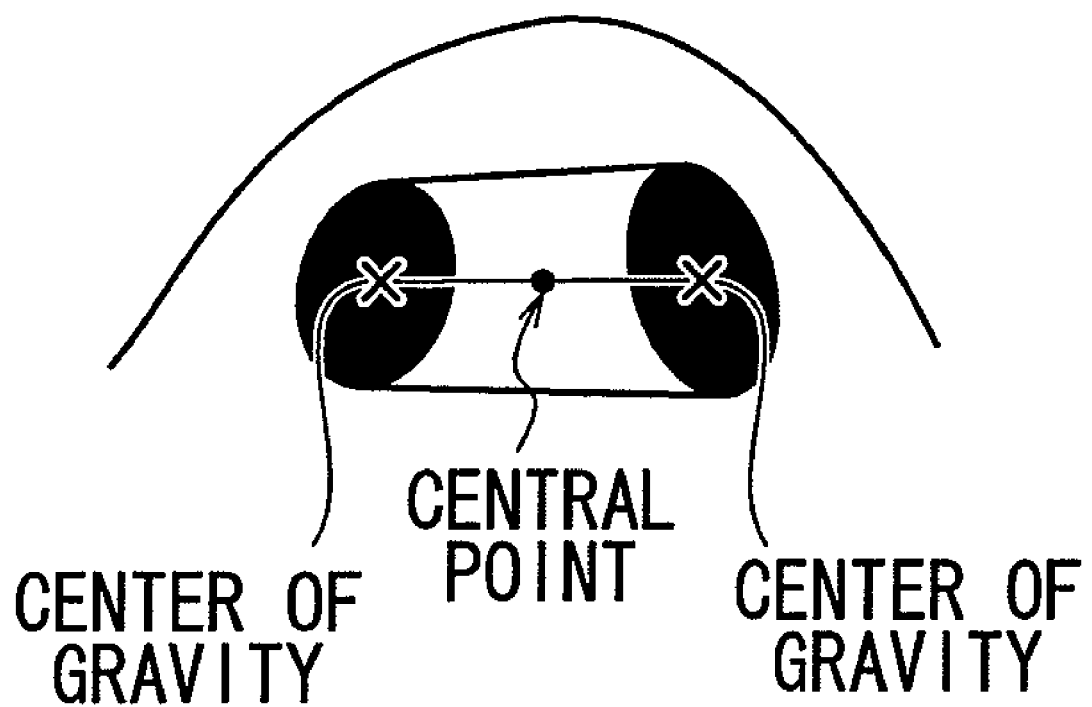
FIG. 3 is a drawing showing the central point of the centers of gravity of regions showing nostrils in the face image.

Then, on the basis of the regions expressing the two nostrils which are adjacent to one another and are obtained as described above, the position (a position expressed by image coordinates) of the central point of the centers of gravity of the regions of the left and right nostrils in the face image is detected as the nose position as shown in FIG. 3.

Figure 4:
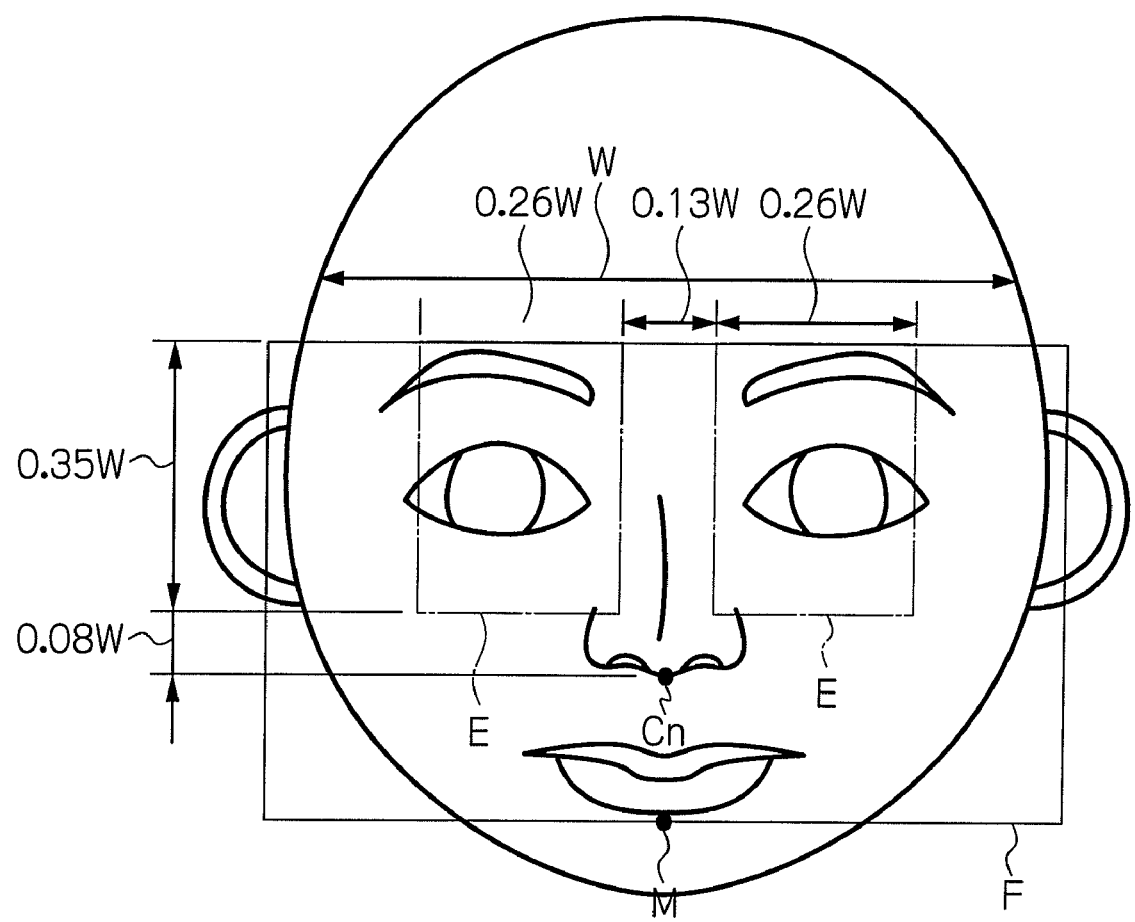
FIG. 4 is a drawing showing a right eye search region and a left eye search region that are set in the face image.

As will be described hereinafter, the eye search region setting section 24 sets the eye search regions by using the detected nose position. As shown in FIG. 4, a right eye search region E and a left eye search region E are set within the face region F on the basis of the detected nose position. Here, the smallest range in which an eye can certainly be detected in the face region F is researched statistically, and this smallest range is set as the eye search region. For example, rectangles, at which the vertical and lateral lengths thereof are lengths obtained by multiplying the vertical and lateral lengths of the face region F by a predetermined ratio, are placed above the nose and separated from one another by a predetermined interval, so as to set the eye search regions.

For example, given that the width of the face region F is W, the right eye search region E and the left eye search region E are rectangles of a length of 0.35 W and a width of 0.26 W. Then, the two rectangles, which are disposed upward from a position which is separated by 0.08 W upward from a center of gravity Cn of the nostrils and which, in the left-right direction, are separated from one another by an interval of 0.13 W which is centered with respect to the center of gravity Cn of the nostrils, are set as the right eye search region E and the left eye search region E.

Figure 5A:
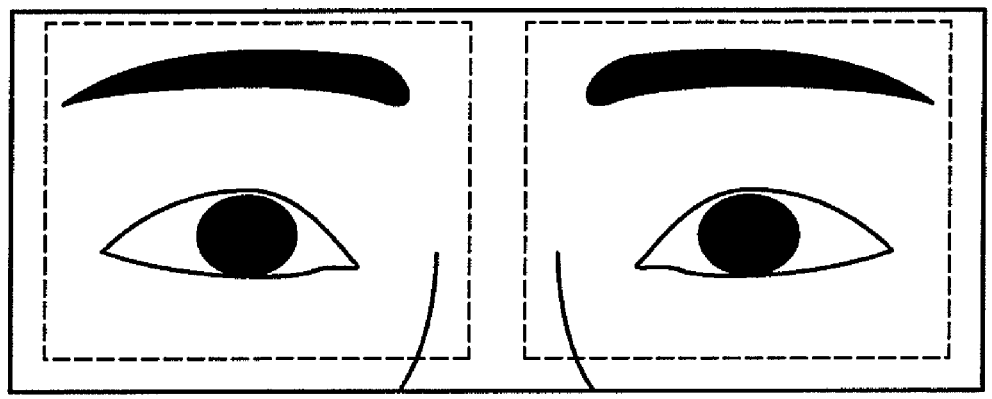
FIG. 5A is a drawing showing a right eye image and a left eye image.
Figure 5B:
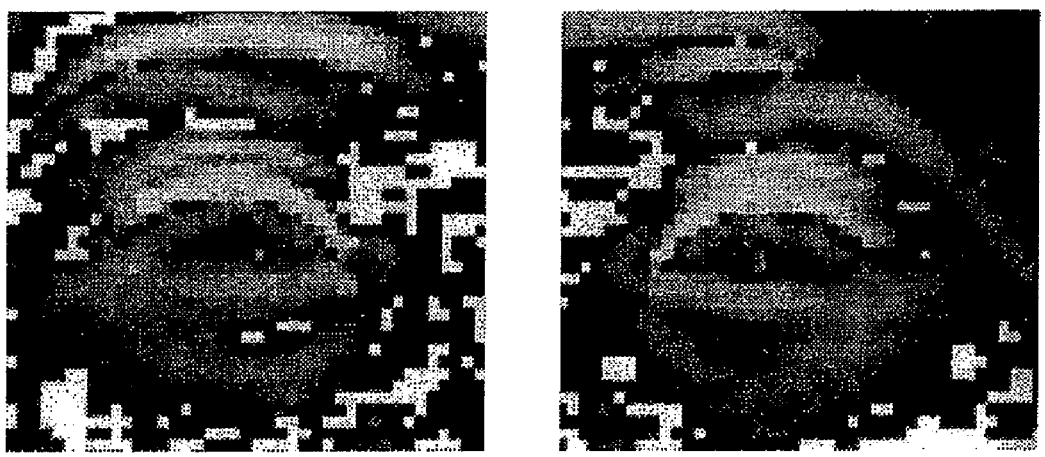
FIG. 5B is a drawing showing Sobel edge images of the right eye image and the left eye image.

For each of the right eye image of the right eye search region and the left eye image of the left eye search region, the eyelid candidate detecting section 26 carries out edge processing, and, from the respective edge images of the left and right eyes, extracts edge characteristic points of the edges corresponding to the boundaries between the lower eyelids and the eyeballs (the upper edges of the lower eyelids). On the basis of the extracted edge characteristic points, the eyelid candidate detecting section 26 detects candidates for the lower eyelid positions (candidates for positions expressed by image coordinates) for the left and right eyes respectively. The extraction of the edge characteristic points is carried out as follows. First, the eyelid candidate detecting section 26 generates Sobel edge images by using the Sobel operator for example, from each of the right eye image of the right eye search region and the left eye image of the left eye search region shown in FIG. 5A. As shown in FIG. 5B, the generated Sobel edge images express the magnitude of the change in gray level per pixel in the direction from top to bottom in the direction of blinking.

The changes in the magnitudes of the pixel value changes of the original images in the direction from top to bottom which is the blinking direction are obtained from the generated Sobel edge images. Generally, the reflectance of the eyeball portion is low and the eyeball portion is photographed as dark, as compared with the eyelid which is a skin portion. Accordingly, in the vicinity of the boundary between the upper eyelid and the eyeball, the pixel values change from light to dark from the top toward the bottom. Further, in a vicinity of the boundary between the lower eyelid and the eyeball, the pixel values change from dark to light from the top toward the bottom. Accordingly, the obtained edge values expressing the pixel value changes are greater than or equal to a positive predetermined value at the boundary portion between the eyeball and the upper eyelid, and the edge value of the center of the boundary portion is the maximum value. Further, at the boundary portion between the eyeball and the lower eyelid, the edge values are less than or equal to a negative predetermined value, and the edge value of the center of the boundary portion is the minimum value.

Accordingly, in a case in which the respective pixels of a pixel row which is the object of detection in a Sobel edge image are scanned from top to bottom and the edge value of a pixel of interest is smaller than a negative threshold value, it is judged whether or not the edge value of the pixel of interest is the minimum value in the blinking direction. If, on the basis of the edge values of the pixel one above the pixel of interest, and of the pixel of interest, and of the pixel one below the pixel of interest, it is judged that the edge value of the pixel of interest is the minimum value, the position of that pixel of interest is detected as an edge characteristic point. In this way, an edge characteristic point, which shows the edge of the boundary between the lower eyelid and the eyeball, is detected. Note that, if plural edge characteristic points showing the edge of the boundary between the lower eyelid and the eyeball are detected, it suffices to select the edge characteristic point which shows the edge of the boundary between the lower eyelid and the eyeball, on the basis of the relative positions of the edge characteristic points that are based on the positions of the nostrils.

The relative position computing section 27 computes, for the left and right eyes respectively, respective relative positions of the image coordinates of the candidates for the lower eyelid positions (relative positions expressed by image coordinates), that are based on the image coordinates of the detected nose position.

For the respective left and right eyes, the eyelid position detecting section 28 compares the respective relative positions of the detected plural candidates for the lower eyelid positions, and the relative positions of the lower eyelid positions which are based on the nose position of the previous time. The eyelid position detecting section 28 detects the image coordinates of the current eyelid positions as the eye positions, and computes time-sequence correspondences of the eye positions for the left and right eyes respectively.

Next, operation of the eye position detecting device 10 will be described. First, the face image of the subject is captured continuously by the image capturing section 12. At this time, in order to reduce the effects of disturbance light of the periphery, the face portion of the subject is illuminated by, for example, causing the illuminating section 14 which is formed from an infrared flash to emit light synchronously with the photographing of the image capturing section 12. Note that if continuous light is emitted from the illuminating section 14, synchronization with the image capturing section 12 becomes unnecessary and the structure is simplified.

Figure 6:
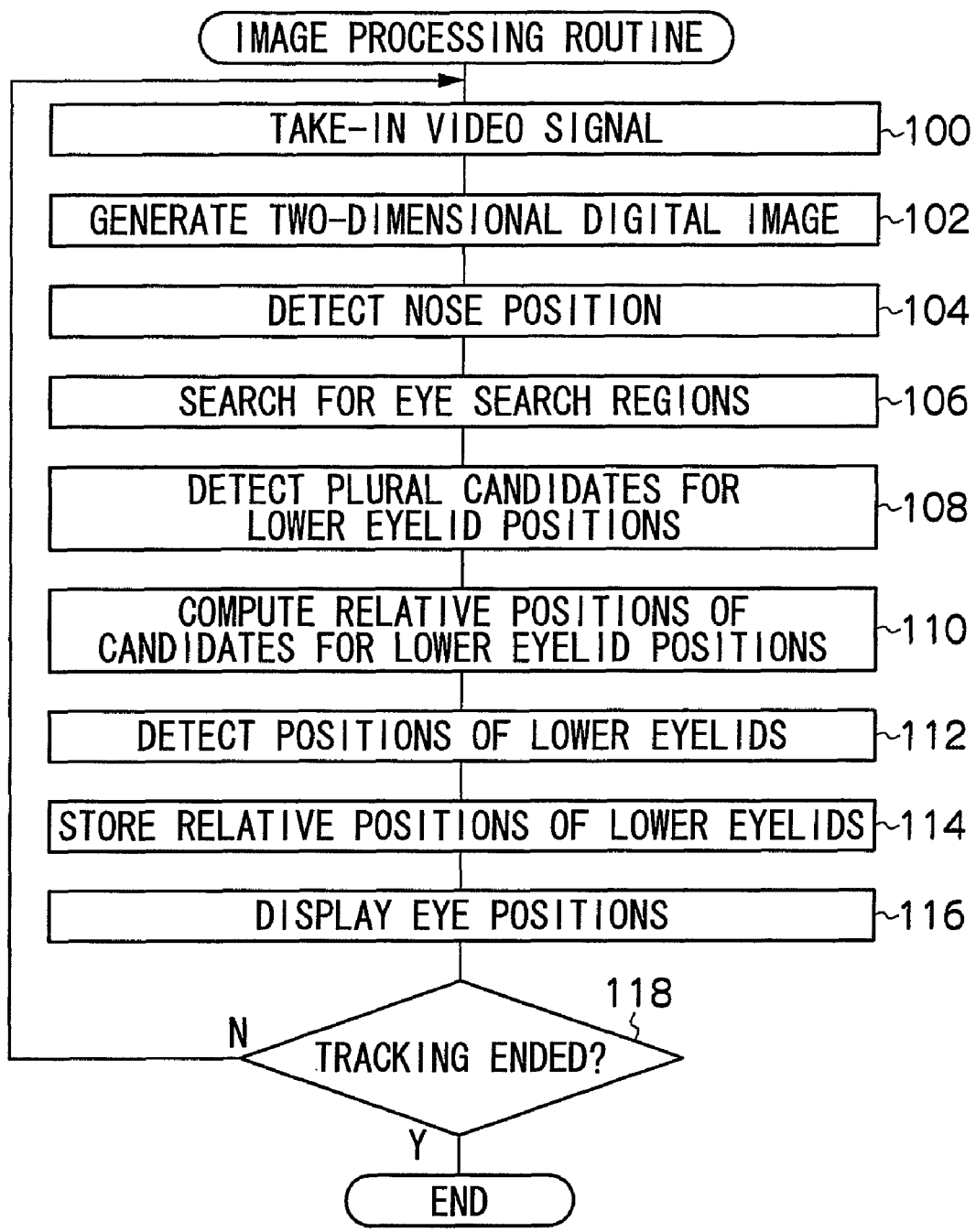
FIG. 6 is a flowchart showing the contents of an image processing routine at the eye position detecting device relating to the first exemplary embodiment of the present invention.

Then, the image processing routine shown in FIG. 6 is executed at the computer 16. First, in step 100, the face image which is captured at the image capturing section 12 is taken-in as a video signal. In step 102, the video signal is AID converted such that a two-dimensional digital image is generated. In the present exemplary embodiment, the processings hereinafter are carried out by digital processing on the basis of this digital image. Therefore, when simply the term "image" is used hereinafter, it means the digital image.

In step 104, the regions showing the left and right nostrils are detected from the face image, and the position of the central point of the centers of gravity of the regions showing the respective left and right nostrils is detected as the nose position. In next step 106, regions, which exist at predetermined positions and whose reference position is the nose position detected in above step 104, are set as the right eye search region and the left eye search region.

Figure 7:
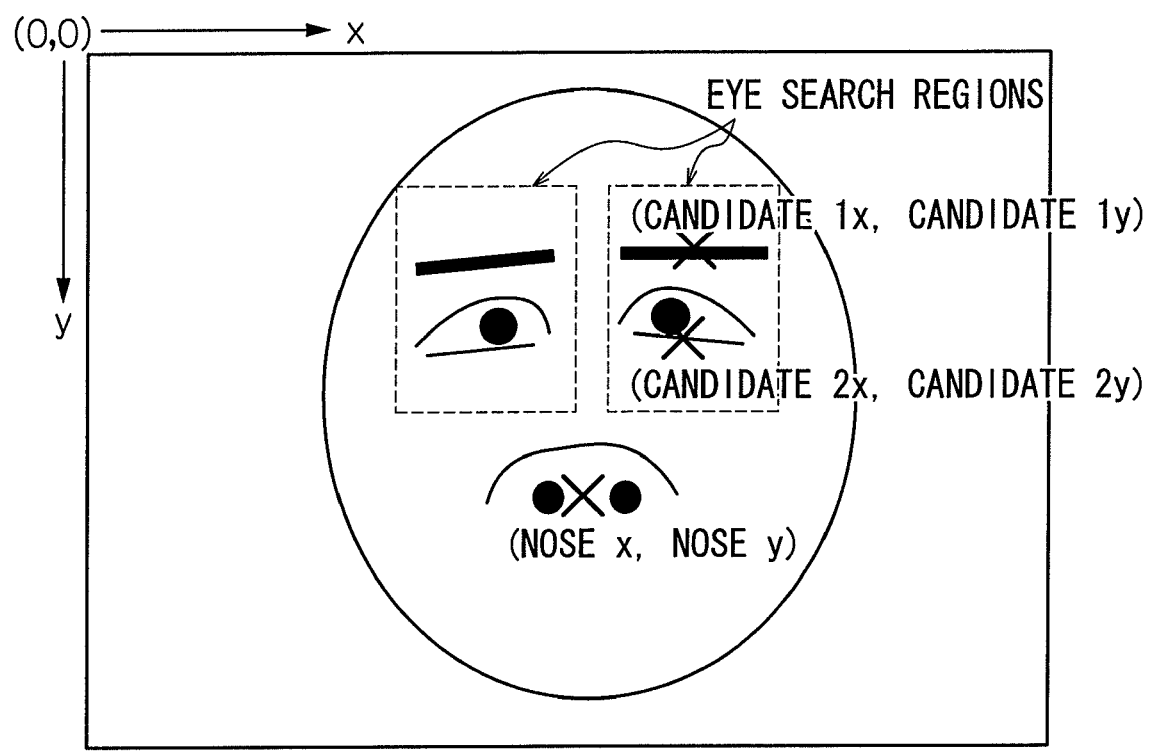
FIG. 7 is a drawing showing a nose position and plural candidates for the position of a lower eyelid.

In step 108, as shown in FIG. 7, edge processing is carried out on both the image of the right eye search region and the image of the left eye search region. On the basis of the respective edge images of the left and right eyes, plural image coordinates (candidate x, candidate y) of candidates for the lower eyelid positions are detected. In next step 110, respective relative positions (relative x, relative y) of the plural candidates for the lower eyelid positions, which are based on the nose position (nose x, nose y), are computed on the basis of the following formula, for the left and right eyes respectively.

(relative $x$, relative $y$)=(candidate $x$−nose $x$, candidate $y$−nose $y$)

Then, in step 112, for the left and right eyes respectively, the relative positions of the previous time which are stored in the previous relative position storing section 30, and the relative positions computed in above step 110, are compared, and the relative positions which are nearest to the relative positions of the previous time are selected. Then, the nose position is made to be the reference position, and positions which are expressed from the reference position and the selected relative positions are detected as the positions of the lower eyelids.

Then, in step 114, for the left and right eyes respectively, the relative positions selected in above step 112, i.e., the relative positions of the eyelid positions detected in step 112 which are based on the nose position detected in step 104, are stored in the previous relative position storing section 30 and the relative positions of the previous time are updated. Then, in step 116, by using the lower eyelid positions detected in step 112, temporal correspondences of the eye positions are displayed on the display device 18 for the left and right eyes respectively.

In step 118, it is judged whether or not tracking processing is to be ended. If it is not to be ended, the routine returns to step 100, and the processings of above-described steps 100 through 116 are executed on the basis of the face image which is newly captured. When it is judged in step 118 that the tracking processing is to be ended, the image processing routine ends.

As described above, in accordance with the eye position detecting device relating to the first exemplary embodiment, the eye positions are detected by comparing candidates for the current relative positions and the relative positions of the previous time, by using a position showing a characteristic of the nose as a reference. In this way, the eye positions are detected by using a position which shows a characteristic of the nose, which position has a high rate of detection and can be detected more easily than the eye positions. Therefore, even if the face moves, the eye positions can be detected and tracked by simple computational processing.

By using the relative positions between the nose and the eyes, which are hold even if the face moves up/down or left/right, the temporal correspondences of the eye positions can be obtained without using an eyelid pattern correlation computing system whose cost of computation is high. Further, the temporal correspondences can be obtained correctly even in cases in which the face moves.

The eye positions can be detected correctly by detecting, as the eye positions, the positions of the boundaries of the lower eyelids whose vertical positions do not move much even when blinking.

In the above-described exemplary embodiment, an example is described of a case in which the position of the boundary of the lower eyelid is detected as the eye position. However, the present invention is not limited to the same. For example, the position of the boundary of the upper eyelid and the eyeball in the face image (i.e., the lower edge of the upper eyelid), the center of gravity of the pupil in the face image, or the central point of the boundary between the upper eyelid and the eyeball and the boundary between the lower eyelid and the eyeball may be detected as the eye position.

Further, an example is described of a case in which a region, at which a vertical positive edge appears at the left, a vertical negative edge appears at the right, a lateral positive edge appears at the top and a lateral negative edge appears at the bottom when facing the image, is detected as a region showing a nostril. However, the present invention is not limited to the same. For example, the average density value, i.e., the average value of the brightness, of the face region extracted from the face image may be computed, and a nostril search start point may be detected by using a black pixel judgment threshold value th corresponding to the computed average density value, and plural search circles which are centered around the nostril search start point and become nostril candidates may be detected, and a pair of circles corresponding to one set of nostrils may be detected as regions showing nostrils.

Further, the positions of the nostrils may be detected as follows: a white-black-white transverse edge, which is an edge that extends along the transverse direction and changes from white to black and then from black to white, is detected. A black pixel row, which is within the nostril region and whose width is two to three pixels, is detected in the vertical direction. A white-black-white transverse edge, which is an edge that extends along the vertical direction and changes from white to black and then from black to white, is detected. A black pixel row, which is within the nostril region and whose width is two to three pixels, is detected in the transverse direction. The position of a nostril is thereby detected.

A second exemplary embodiment will be described next. Note that structural portions which are similar to those of the first exemplary embodiment are denoted by the same reference numerals, and description thereof is omitted.

The second exemplary embodiment differs from the first exemplary embodiment with regard to the point that the position between the eyebrows is detected as the reference position of the relative positions.

Figure 8:
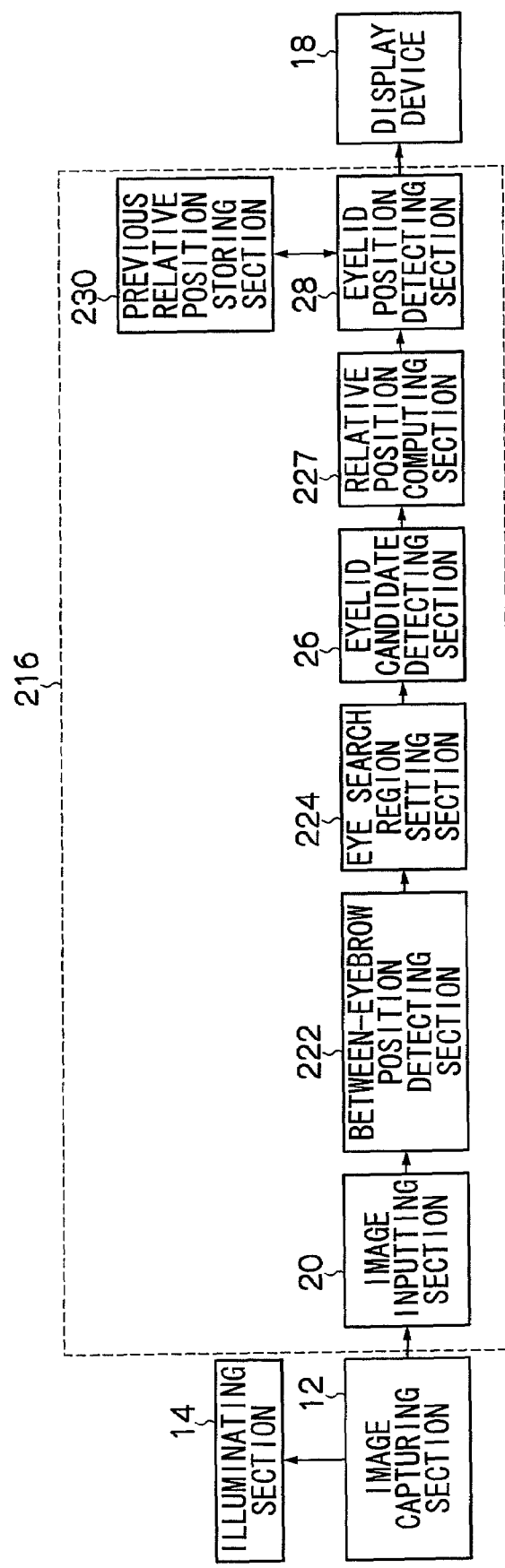
FIG. 8 is a drawing showing the structure of an eye position detecting device relating to a second exemplary embodiment of the present invention.

As shown in FIG. 8, a computer 216 of an eye position detecting device 210 relating to the second exemplary embodiment has: the image inputting section 20; a between-eyebrow position detecting section 222 detecting a between-eyebrow position from the face image which is the output of the image inputting section 20; an eye search region setting section 224 setting eye search regions on the basis of the detected between-eyebrow position; the eyelid candidate detecting section 26; a relative position computing section 227 computing the relative positions of the respective candidates for the lower eyelid positions, with respect to the between-eyebrow position; the eyelid position detecting section 28; and a previous relative position storing section 230 storing the relative positions of the lower eyelid positions which are based on the between-eyebrow position of the previous time.

Figure 9:
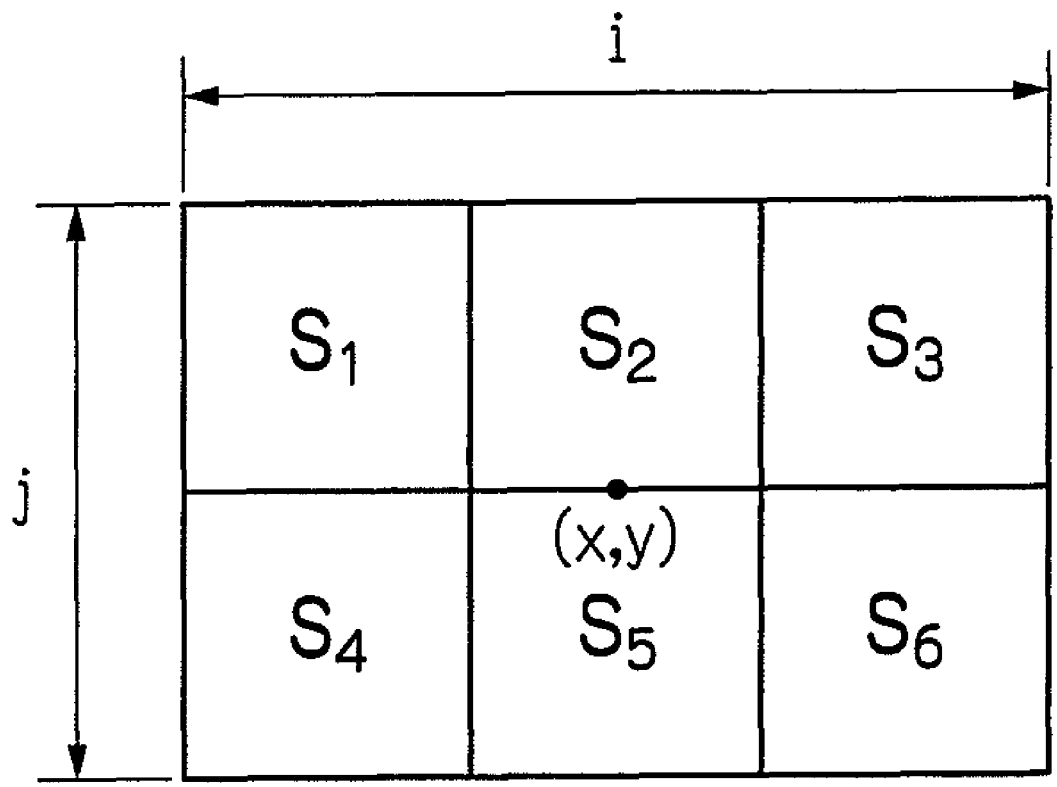
FIG. 9 is a drawing showing a six-segmented rectangular filter for detecting a between-eyebrow position.
Figure 10:
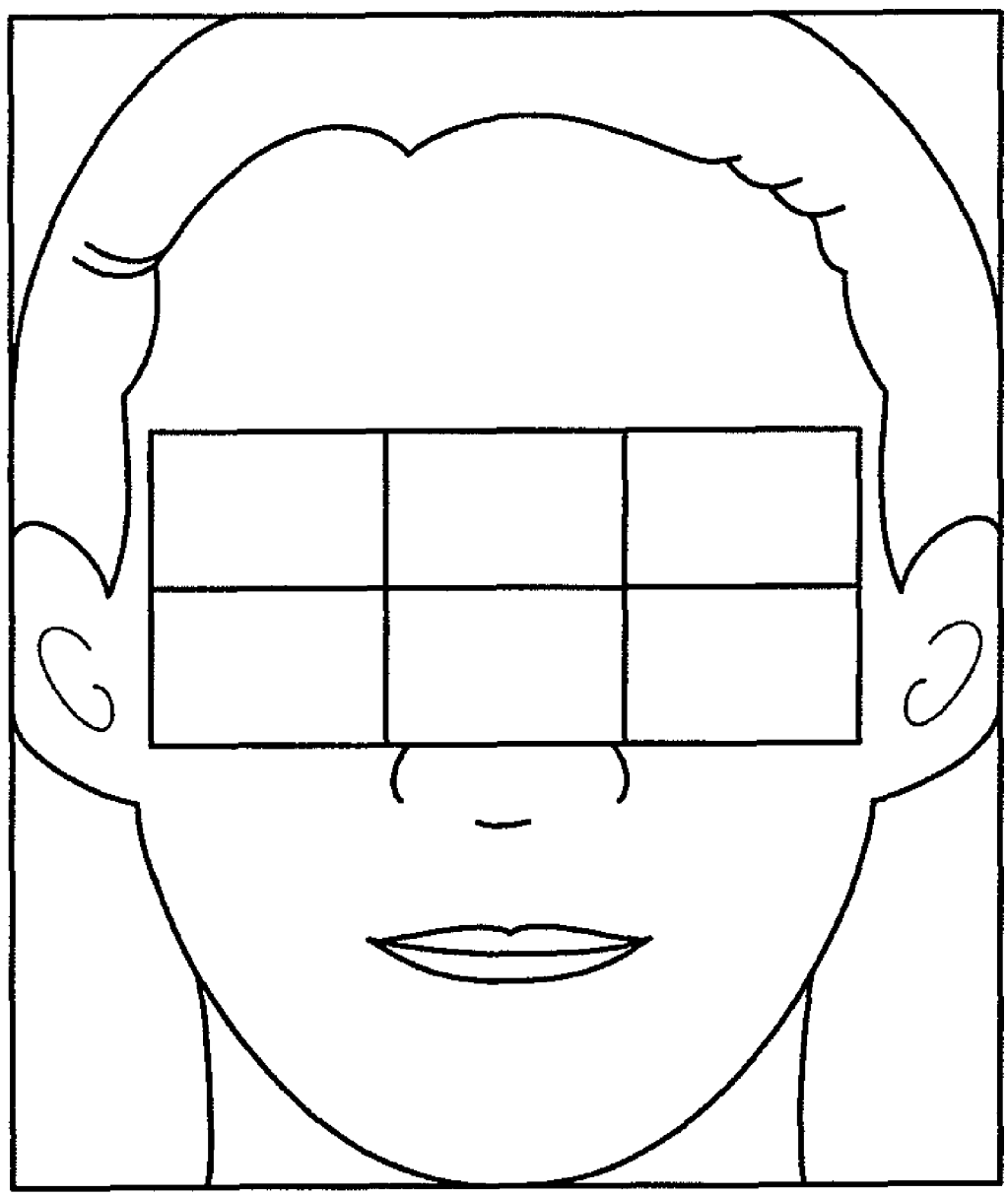
FIG. 10 is a drawing showing a state in which the six-segmented rectangular filter is applied to the face image.

The between-eyebrow position detecting section 222 detects the between-eyebrow position, which shows a characteristic of the region between the eyebrows, from the face image as follows. A filter that detects the region between the eyebrows such as shown in FIG. 9 for example, in which six rectangular shapes are joined together, is used. This between-eyebrow detecting filter which is a six-segmented rectangular filter extracts the characteristics of the face that the bridge of the nose is brighter than the both eye regions and the eye regions are darker than the cheeks, and determines a position that shows the characteristic of the region between the eyebrows of the face. The between-eyebrow detecting filter has a rectangular frame which is centered around a point (x,y) and which is i pixels transversely (i is a natural number) and j pixels vertically (j is a natural number). Then, as shown in FIG. 10, the between-eyebrow detecting filter is applied to the face image, and positions of between-eyebrow candidate points are extracted by filtering processing. Then, an object image is cut-out to a predetermined size with the extracted position of the between-eyebrow candidate point being the center, pattern determination processing is carried out, the true candidate point is selected from among the between-eyebrow candidate points, and the between-eyebrow position is detected.

The eye search region setting section 224 sets a face region in the face image, and sets a right eye search region and a left eye search region within the face region on the basis of the detected between-eyebrow position. For example, rectangles, at which the vertical and lateral lengths thereof are lengths obtained by multiplying the vertical and lateral lengths of the face region by a predetermined ratio, are set at the right and the left of the detected between-eyebrow position and separated from one another by a predetermined interval, and are made to be the right eye search region and the left eye search region.

The relative position computing section 27 computes, for the left and right eyes respectively, respective relative positions of the candidates for the lower eyelid positions which are based on the detected between-eyebrow position.

The relative positions of the lower eyelid positions of the previous time, which are based on the between-eyebrow position which was detected the previous time, are stored in the previous relative position storing section 230 for the left and right eyes respectively.

In the second exemplary embodiment, in the edge image processing routine, the between-eyebrow position is detected from the face image, and, by using the detected between-eyebrow position as the reference position, regions existing at predetermined positions are set as the right eye search region and the left eye search region. Then, plural candidates for the lower eyelid position are detected from each of the image of the right eye search region and the image of the left eye search region. Relative positions of the between-eyebrow position and the respective candidates for the lower eyelid position are computed for each of the left and right eyes. The relative positions of the previous time, which are stored in the previous relative position storing section 230, and the computed relative positions are compared with one another for the left and right eyes respectively, and the relative positions which are nearest to the relative positions of the previous time are selected. The detected current between-eyebrow position is used as the reference position, and positions which are expressed from the reference position and the selected relative positions are detected as the positions of the lower eyelids.

For the left and right eyes respectively, the detected relative positions of the lower eyelid positions, which are based on the detected between-eyebrow position, are stored in the previous relative position storing section 230 and the relative positions of the previous time are updated.

By detecting the eye positions in this way by comparing the candidates for the current relative positions with the relative positions of the previous time by using a position expressing a characteristic of the region between the eyebrows as a reference, the eye positions are detected by using a position expressing a characteristic of the region between the eyebrows which is easier to detect than the eye positions and whose detection rate is high. Therefore, even if the face moves, the eye positions can be detected and tracked by simple computational processing.

A third exemplary embodiment will be described next. Note that structural portions which are similar to those of the first exemplary embodiment are denoted by the same reference numerals, and description thereof is omitted.

The third exemplary embodiment differs from the first exemplary embodiment with regard to the point that the eye search regions are set on the basis of the nose position and the relative positions of the lower eyelids the previous time.

Figure 11:
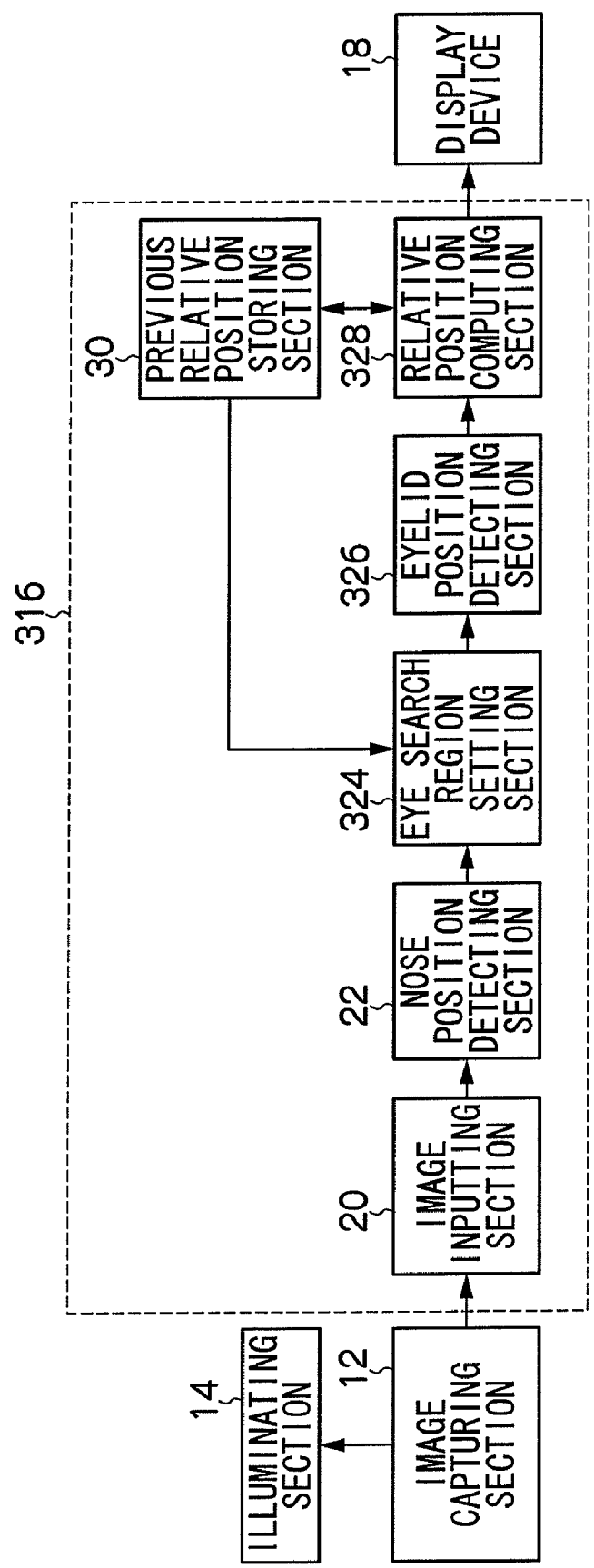
FIG. 11 is a drawing showing the structure of an eye position detecting device relating to a third exemplary embodiment of the present invention.

As shown in FIG. 11, a computer 316 of an eye position detecting device 310 relating to the third exemplary embodiment has: the image inputting section 20; the nose position detecting section 22; an eye search region setting section 324 that sets the eye search regions on the basis of the nose position and the relative positions of the lower eyelids the previous time; an eyelid position detecting section 326 that detects the positions of the lower eyelids from the eye search regions; a relative position computing section 328 that computes the relative positions of the detected lower eyelid positions which are based on the nose position; and the previous relative position storing section 30.

Figure 12:
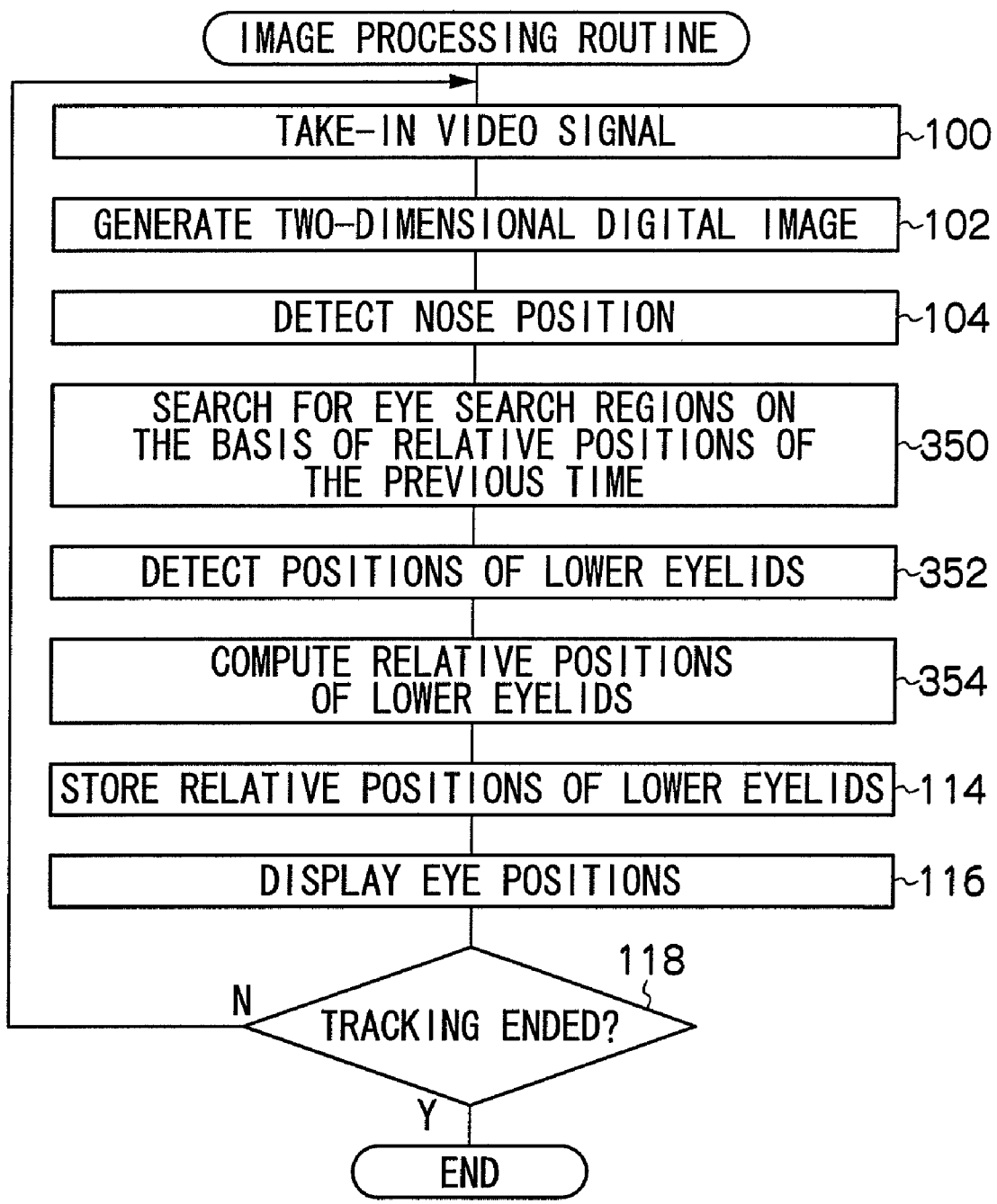
FIG. 12 is a flowchart showing the contents of an image processing routine at the eye position detecting device relating to the third exemplary embodiment of the present invention.

The image processing routine relating to the third exemplary embodiment will be described next by using FIG. 12. Note that processings which are similar to those of the first exemplary embodiment are denoted by the same reference numerals, and detailed description thereof is omitted.

First, in step 100, the face image which is captured at the image capturing section 12 is taken-in as a video signal. In step 102, the video signal is A/D converted such that a two-dimensional digital image is generated. Then, in step 104, the regions showing the left and right nostrils are detected from the face image, and the position of the central point of the centers of gravity of the regions showing the respective left and right nostrils is detected as the nose position.

In next step 350, by using the nose position, which was detected in above-described step 104, as the reference position, small regions, which are centered around a position expressed by the reference position and the relative positions of the previous time stored in the previous relative position storing section 30, are set as the left eye search region and the right eye search region.

Then, in step 352, edge processing is carried out on the image of the right eye search region and the image of the left eye search region, and edge characteristic points are detected on the basis of the obtained edge images of the left and right eyes. On the basis of the detected edge characteristic points, the lower eyelid positions are detected as the eye positions for the left and right eyes respectively. In subsequent step 354, the relative positions of the lower eyelid positions detected in step 352, which are based on the nose position detected in step 104, are computed for the left and right eyes respectively. Then, in step 114, the relative positions computed in step 354 are stored in the previous relative position storing section 30, and the relative positions of the previous time are updated for the left and right eyes respectively. Then, in step 116, by using the lower eyelid positions detected in step 352, temporal correspondences of the eye positions are displayed on the display device 18 for the left and right eyes respectively.

Then, in step 118, it is judged whether or not tracking processing is to be ended. If it is not to be ended, the routine returns to step 100, and the above-described processings are executed on the basis of the face image which is newly captured. When it is judged in step 118 that the tracking processing is to be ended, the image processing routine ends.

In this way, a position expressing a characteristic of the nose is made to be the reference, and the eye positions are detected by using the relative positions of the previous time. The eye positions are thereby detected by using a position expressing a characteristic of the nose, which is easier to detect than the eye positions and which has a high detection rate. Therefore, even if the face moves, the eye positions can be detected and tracked by simple computational processing.

The eye search regions can be specified by setting the eye search regions at positions expressed by the reference position, which is the nose position, and the relative positions of the previous time. Therefore, the eye positions can be detected by a simple computational processing.

A fourth exemplary embodiment will be described next. Note that the structure of the eye position detecting device relating to the fourth exemplary embodiment is similar to that of the first exemplary embodiment. Thus, the same reference numerals are used therefor, and description thereof is omitted.

The fourth exemplary embodiment differs from the first exemplary embodiment with regard to the point that an eye position, which is expressed by the vertical direction position of the boundary of the lower eyelid and the left-right direction position of the boundary of the upper eyelid, is detected.

Figure 13:
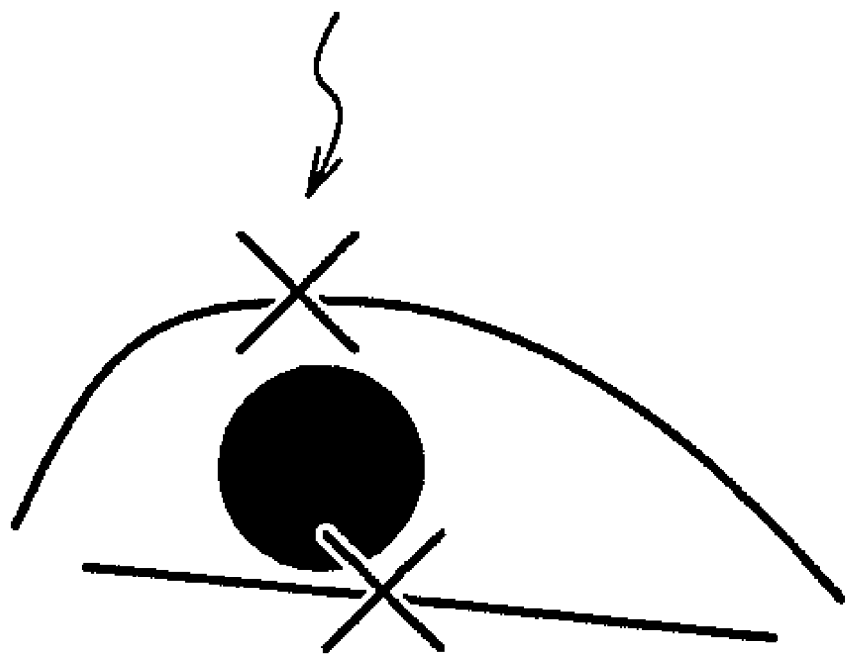
FIG. 13 is a drawing showing an inflection point of a boundary of an upper eyelid and a point of a boundary of a lower eyelid, for showing an eye position.

In the eye position detecting device relating to the fourth exemplary embodiment, as shown in FIG. 13, edge characteristic points, which express the boundary between the upper eyelid and the eyeball, are detected from the edge image of the eye search region. Then, the edge characteristic point, that corresponds to the inflection point of the curve showing the boundary of the upper eyelid at the time when the eye is open, is extracted from the detected edge characteristic points, and the left-right direction position of the extracted edge characteristic point is detected. Further, edge characteristic points, which express the boundary between the lower eyelid and the eyeball, are detected from the edge image of the eye search region. The vertical direction position of the boundary between the lower eyelid and the eyeball is detected from the detected edge characteristic points. Then, the left-right direction position of the inflection point of the boundary of the upper eyelid which was detected as described above, is detected as the left-right direction position of the eye position. The vertical direction position of the boundary between the lower eyelid and the eyeball is detected as the vertical direction position of the eye position. The eye position is thereby detected.

In detecting the position of the upper eyelid, the edge maximum point, whose edge value is greater than or equal to a positive predetermined value and whose edge value is the maximum value, is searched for on the basis of the edge image. It suffices to detect the edge maximum point, which is found above the position of the lower eyelid, as the edge characteristic point showing the boundary between the upper eyelid and the eyeball. Further, there is the possibility that the edge maximum point showing the iris will be detected above the position of the lower eyelid. However, a positive threshold value is provided for the edge value of the detected edge characteristic point, and it suffices to exclude the edge maximum point that shows the iris.

When the eye is opened, the upper eyelid is curved roundly, and determining a representative position in the left-right direction is easier at the upper eyelid than at the lower eyelid. Accordingly, by detecting the left-right direction position of the inflection point of the boundary of the upper eyelid as described above, the left-right direction position of the eye position can be detected easily. Further, because the lower eyelid is close to rectilinear, the vertical direction position of the eye position can be easily detected by detecting the vertical direction position of the boundary of the lower eyelid.

Note that the above exemplary embodiments describe examples of cases of detecting eye positions, but the present invention is not limited to the same. For example, the position of eyeglasses, or the position of a predetermined region of the face such as the position of the mouth, the position of the eyebrow, the position of the jaw, the position of the ear, or the like may be detected.

Further, a case, in which an edge image which shows the magnitudes of the changes in the gray levels is generated from the gray-level image inputted at the image inputting section, is described as an example. However, the image which is inputted at the image inputting section may be a color image. In this case, it suffices to generate an edge image which shows the magnitudes of the changes in the density values of the color image.

An example is described of a case in which the point at which the edge value of the edge image is the minimum value is detected as the edge characteristic point corresponding to the edge of the lower eyelid, and the point where the edge value is the maximum value is detected as the edge characteristic point corresponding to the edge of the upper eyelid. However, the present invention is not limited to the same. For example, in a case in which the eyeball portion is bright and the skin portion is dark in an eye image, the point where the edge value of the edge image is the maximum value may be detected as the edge characteristic point on the edge of the lower eyelid, and the point where the edge value is the minimum value may be detected as the edge characteristic point on the edge of the upper eyelid.

The face region detecting device relating to the present invention is structured to include: an image capturing section capturing a face of an observed person; a position detecting section detecting, from a face image expressing the face captured by the image capturing section, one of a position expressing a characteristic of a nose and a position expressing a characteristic of a region between eyebrows; a computing section computing a past relative position of a predetermined region of the face that is based on the position detected in the past by the position detecting section; and a region position detecting section detecting a position of the predetermined region on the basis of the past relative position computed by the computing section and the current position detected by the position detecting section.

A program relating to the present invention is a program causing a computer to function as: a position detecting section detecting, from a face image expressing a face captured by an image capturing section that captures a face of an observed person, one of a position expressing a characteristic of a nose and a position expressing a characteristic of a region between eyebrows; a computing section computing a past relative position of a predetermined region of the face that is based on the position detected in the past by the position detecting section; and a region position detecting section detecting a position of the predetermined region on the basis of the past relative position computed by the computing section and the current position detected by the position detecting section.

In accordance with the present invention, the face of an observed person is captured by the image capturing section. Either one of a position that expresses a characteristic of a nose and a position that expresses a characteristic of a region between the eyebrows is detected by the position detecting section from the face image expressing the face captured by the image capturing section. Further, a past relative position of a predetermined region of the face, that is based on the position detected in the past by the position detecting section, is computed by the computing section.

Then, the position of the predetermined region is detected by the region position detecting section on the basis of the past relative position computed by the computing section and the current position detected by the position detecting section.

In this way, the position of a predetermined region of the face is detected by using the past relative position, by using as a reference one of the position expressing a characteristic of a nose and a position expressing a characteristic of a region between the eyebrows. The position of the predetermined region of the face is thereby detected by using a position expressing a characteristic of the nose or a position expressing a characteristic of the region between the eyebrows, both of which can be detected easily. Therefore, even if the face moves, the position of the predetermined region of the face can be detected by a simple computational processing.

The face region detecting device of the present invention may further include a candidate detecting section detecting a plurality of candidates for the position of the predetermined region, and the region position detecting section may detect the position of the predetermined region by comparing current relative positions of the respective plurality of candidates that are based on the current position detected by the position detecting section, and the past relative position computed by the computing section. In this way, the past relative position and the candidates for the current relative position are compared, and the current position of the predetermined region can be detected by simple computational processing.

The region position detecting section relating to the present invention may detect the position of the predetermined region on the basis of the past relative position computed by the computing section, that is based on the current position detected by the position detecting section. In this way, the current position of the predetermined region can be detected by simple computational processing.

The aforementioned position expressing a characteristic of a nose may be a position of a central point of centers of gravity of left and right nostril regions in the face image. In this way, the current position of the predetermined region can be detected by simple computational processing by using the regions of the left and right nostrils which can be detected easily.

Further, the aforementioned position of the predetermined region of the face may be a position of an eye, and the position of the eye may be expressed by one of a boundary between an upper eyelid and an eyeball in the face image, a boundary between a lower eyelid and the eyeball in the face image, a center of gravity of a pupil in the face image, and a central point of the boundary between the upper eyelid and the eyeball and the boundary between the lower eyelid and the eyeball.

The aforementioned position of the predetermined region of the face may be a position of an eye, and the position of the eye may be expressed by a vertical direction position of a boundary between a lower eyelid and an eyeball in the face image, and a left-right direction position of a boundary between an upper eyelid and the eyeball. The position of the predetermined region of the face can thereby be expressed with high accuracy.

A face region detecting method relating to the present invention includes: detecting, from a face image expressing a face captured by an image capturing section that captures a face of an observed person, one of a position expressing a characteristic of a nose and a position expressing a characteristic of a region between eyebrows; computing a past relative position of a predetermined region of the face that is based on the position detected in the past; and detecting a position of the predetermined region on the basis of the computed past relative position and the detected current position.

The present invention provides a computer readable medium storing a program causing a computer to execute a process for face region detection, the process comprising: detecting, from a face image expressing a face captured by an image capturing section that captures a face of an observed person, one of a position expressing a characteristic of a nose and a position expressing a characteristic of a region between eyebrows; computing a past relative position of a predetermined region of the face that is based on the position detected in the past; and detecting a position of the predetermined region on the basis of the computed past relative position and the detected current position.

As described above, in accordance with the present invention, the position of a predetermined region of the face is detected by using the past relative position, by using as a reference one of a position expressing a characteristic of a nose and a position expressing a characteristic of a region between the eyebrows. The position of the predetermined region of the face is thereby detected by using a position expressing a characteristic of the nose or a position expressing a characteristic of the region between the eyebrows, both of which can be detected easily. Therefore, the effect is obtained that, even if the face moves, the position of the predetermined region of the face can be detected by a simple computational processing.

What is claimed is:

1. A face region detecting device comprising:
an image capturing means capturing a face of an observed person;
a position detecting means detecting, from a face image expressing the face captured by the image capturing means, one of a position expressing a characteristic of a nose and a position expressing a characteristic of a region between eyebrows;
a computing means computing a past relative position of an eye of the face that is based on the position detected in the past by the position detecting means; and
a region position detecting means detecting a position of the eye that is expressed by a vertical direction position of a boundary between a lower eyelid and an eyeball in the face image, and a left-right direction position of a boundary between an upper eyelid and the eyeball, on the basis of the past relative position computed by the computing means and the current position detected by the position detecting means.

2. The face region detecting device of claim 1, further comprising a candidate detecting means that detects the vertical direction position of the boundary between the lower eyelid and the eyeball in the face image, and the left-right direction position of the boundary between the upper eyelid and the eyeball, and the candidate detecting means detecting a plurality of candidates for the position of the eye that is expressed by the detected vertical direction position of the boundary between the lower eyelid and the eyeball, and the detected left-right direction position of the boundary between the upper eyelid and the eyeball,
wherein the region position detecting means detects the position of the eye by comparing current relative positions of the respective plurality of candidates that are based on the current position detected by the position detecting means, and the past relative position computed by the computing means.

3. The face region detecting device of claim 1, wherein the region position detecting means, on the basis of the past relative position computed by the computing means, that is based on the current position detected by the position detecting means, detects the vertical direction position of the boundary between the lower eyelid and the eyeball in the face image, and the left-right direction position of the boundary between the upper eyelid and the eyeball, and detects the position of the eye that is expressed by the detected vertical direction position of the boundary between the lower eyelid and the eyeball, and the detected left-right direction position of the boundary between the upper eyelid and the eyeball.

4. The face region detecting device of claim 1, wherein the position expressing a characteristic of a nose is a position of a central point of centers of gravity of left and right nostril regions in the face image.

5. The face region detecting device of claim 1, wherein the left-right direction position of the boundary between the upper eyelid and the eye ball is a left-right direction position of an inflection point of a curve showing the boundary between the upper eyelid and the eye ball.

* * * * *